(12) United States Patent
Kurita et al.

(10) Patent No.: US 6,530,461 B2
(45) Date of Patent: Mar. 11, 2003

(54) CLUTCH UNIT

(75) Inventors: Masahiro Kurita, Kuwana (JP);
Masahiro Kawai, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/853,039

(22) Filed: May 11, 2001

(65) Prior Publication Data

US 2002/0003074 A1 Jan. 10, 2002

(30) Foreign Application Priority Data

May 11, 2000 (JP) ........................................ 2000-138876

(51) Int. Cl.$^7$ ................................................ F16D 41/08
(52) U.S. Cl. ...................................... 192/44; 192/223.2
(58) Field of Search ............................ 192/44, 38, 43, 192/223.2

(56) References Cited

U.S. PATENT DOCUMENTS

| | | | | |
|---|---|---|---|---|
| 3,243,023 A | * | 3/1966 | Boyden | ................... 192/223.2 |
| 4,284,183 A | * | 8/1981 | Brisabois et al. | ........... 180/249 |
| 4,881,624 A | * | 11/1989 | Ullmann | ...................... 188/163 |
| 5,103,950 A | * | 4/1992 | Ito et al. | ...................... 180/248 |
| 5,348,126 A | * | 9/1994 | Gao | .......................... 192/223.2 |
| 6,273,233 B1 | * | 8/2001 | Denis | ....................... 192/223.2 |

* cited by examiner

Primary Examiner—Saul Rodriguez
(74) Attorney, Agent, or Firm—Arent Fox Kintner Plotkin & Kahn

(57) ABSTRACT

A clutch unit includes an outer ring, an inner rings a plurality of rollers, a retainer for retaining the rollers, and a centering spring mounted in the retainer. A plurality of cam surfaces are formed at equal intervals at the inner circumference of the outer ring, and a circumferential surface is formed at the outer circumference of the inner ring. An operation member is mounted at the outer circumference of the outer ring, and an input torque is provided to the outer ring from the operation member. The inner ring is coupled to an output member. A pair of engaging portions in the centering spring are engaged with a stationary side member, which couples the retainer to the stationary side member through the centering spring in the pivotal direction.

2 Claims, 5 Drawing Sheets

CLUTCH UNIT

BACKGROUND OF THE INVENTION

The present invention relates to a clutch unit for transmitting/cutting off a torque between an input side member and an output side member through an engaging element.

A mechanical clutch using an engaging element such as a roller or a ball controls transmission/blocking of a torque by engaging/disengaging the engaging element into a wedge-shaped clearance formed between an input side member and an output side member. More specifically, the engagement of the engaging element into the wedge-shaped clearance locks the input side member and the output side member through the engaging element, so that a torque is transmitted between these members through the engaging element. The disengagement of the engaging element from the wedge-shaped clearance allows the input side member and the output side member to run idle relative to each other, so that the torque is cut off between these members. The engagement/disengagement of the engaging element to/from the wedge-shaped clearance is automatically switched by switching the rotation direction in some cases and by pivoting a retainer retaining the engaging element in other cases.

For example, in a unit which positions or adjusts the position of members by transmitting an input torque produced by the pivotal movement of an operation member to the output side mechanism, when the pivotal movement is completed and the operation member is released, the position of the output side mechanism must be held while the operation member must automatically regain the original position.

SUMMARY OF THE INVENTION

It is an object of the present invention to provide a clutch unit capable of achieving the above-described function.

In order to achieve the above-described object, the present invention provides a structure including an input side member having a cam surface, an output side member having a circumferential surface, an engaging element interposed between the cam surface of the input side member and the circumferential surface of the output side member, a retainer for retaining the engaging element, and an elastic member for coupling the retainer to a stationary side member in the pivotal direction.

Herein, the "input side member" refers to a member provided with an input torque through an operation member or the like. The input side member has a cam surface forming a wedge-shaped clearance between the circumferential surface of the output side member and itself. The cam surface may directly be provided at an axial member, or a ring shaped member having a cam surface fixed at an axial member may be employed.

The "output side member" pivots together with the input side member through the engaging/disengaging function of the engaging element, while runs idle relative to the input side member. The output side member has a circumferential surface. The circumferential surface may be provided directly at an axial member or a ring shaped member having a circumferential surface fixed at an axial member may be employed.

The "engaging element" is applicable to a roller shaped member or a ball shaped member, or the like.

In the above construction, when an input torque is provided to the input side member, the cam surface moves relative to the engaging element in the pivotal direction as the input side member pivots. The rollers thus engage with the wedge-shaped clearances. Thus, the input torque from the input side member is transmitted to the output side member through the engaging element. Then, the input side member, the engaging element, the retainer and the output side member pivot together. As the retainer pivots, the elastic member coupling the retainer to the stationary side member in the pivotal direction deflects, and the elastic force corresponding to the deflection amount is accumulated at the elastic member. When the input side member is allowed to pivot for a prescribed amount and then released, the elastic force accumulated at the elastic member causes the pivotal force to act upon the retainer. The engaging element is pressed by the retainer to press the cam surface, so that the engaging element, the retainer and the input side member run idle relative to the output side member and regain the original positions.

In the above construction, a wedge-shaped clearance may be formed in both normal and reverse directions between the cam surface of the input side member and the circumferential surface of the output side member. Thus, the above-described function may be achieved to an input torque in the normal and reverse directions.

Also in the above construction, a stopper portion for restricting the pivotal range of the input side member may be provided. Thus, the input side member does not excessively pivot and therefore no excess force acts upon the elastic member.

According to the present invention, a clutch unit capable of transmitting an input torque from the input side member to the output side member, while maintaining the pivotal position of the output side member, and automatically returning the input side member to the initial position can be provided.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENT

An embodiment of the present invention will be now descried in conjunction with the accompanying drawings.

Figure 1:
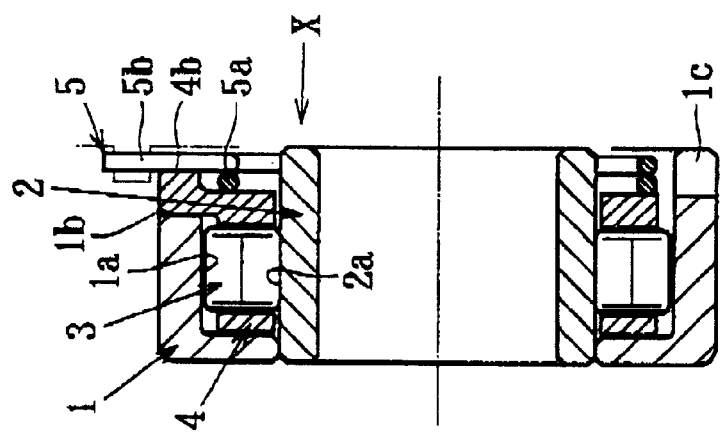
FIG. 1A is a longitudinal section of a clutch unit according to an embodiment of the present invention.
FIG. 1B is a cross section of the unit.
Figure 1:
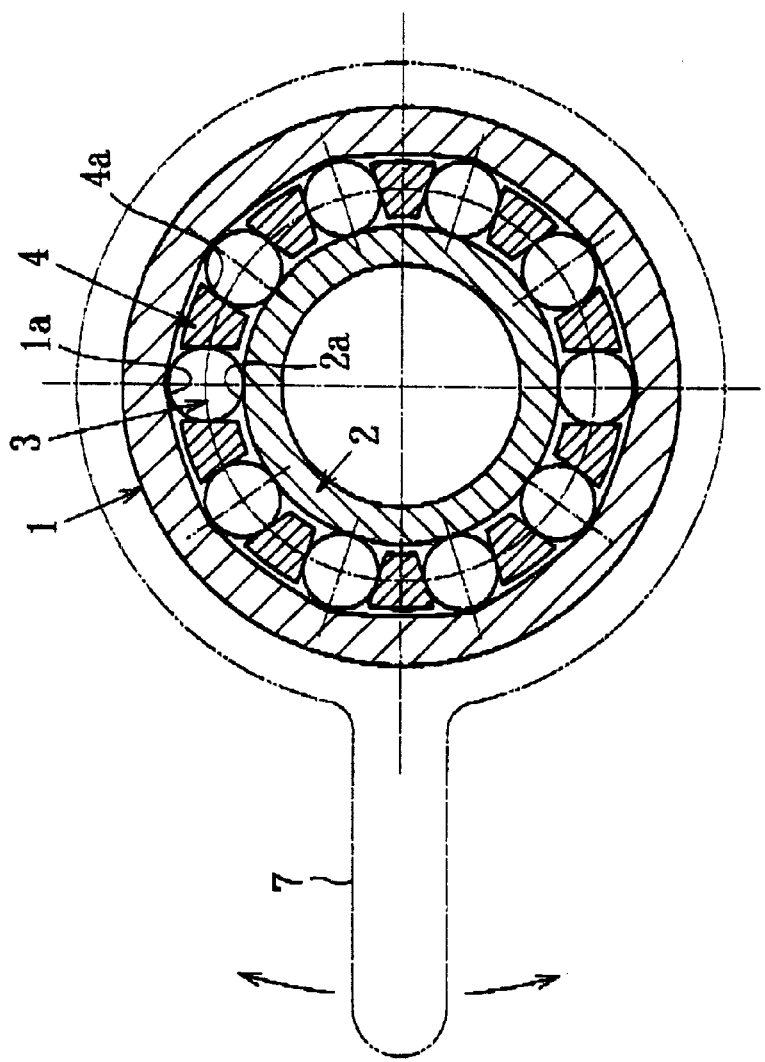

As shown in FIGS. 1A and 1B, a clutch unit according to the embodiment includes as main elements an outer ring 1 as an input side member, an inner ring 2 as an output side member, a plurality of rollers 3 as an engaging element, a retainer 4 retaining the rollers 3, an elastic member mounted to the retainer 4 such as a centering spring 5.

A plurality of cam surfaces 1a are formed at equal intervals at the inner circumference of the outer ring 1, and circumferential surfaces 2a are formed at the outer circumference of the inner ring 2. According to the embodiment, the cam surface 1a defines a wedge-shaped clearance both in the normal and reverse directions with the circumferential surface 2a. At the outer circumference of the outer ring 1, an operation member 7 is pressed in, secured, or mounted by appropriate means such as projection-recess engagement in the pivotal direction. An input torque is provided to the outer ring 1 from the operation member 7. The inner ring 2 is coupled with an output member which is not shown.

Figure 2:
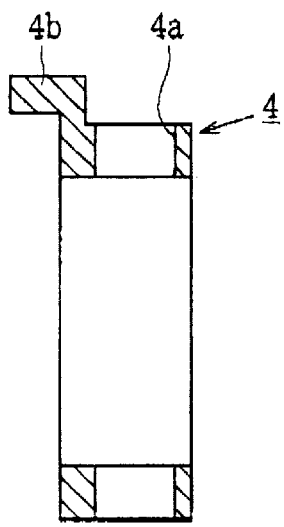
FIG. 2A is a longitudinal section of a retainer.
FIG. 2B is a front view of the retainer.
Figure 2:
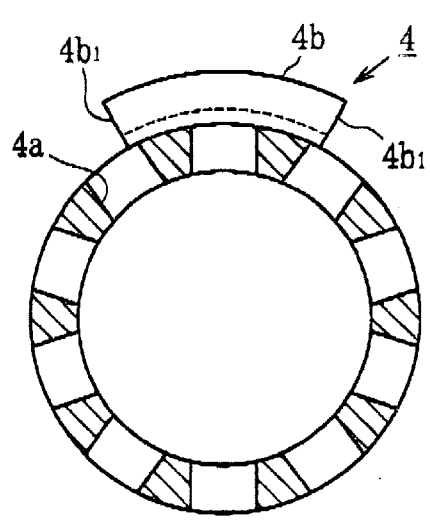
Figure 3:
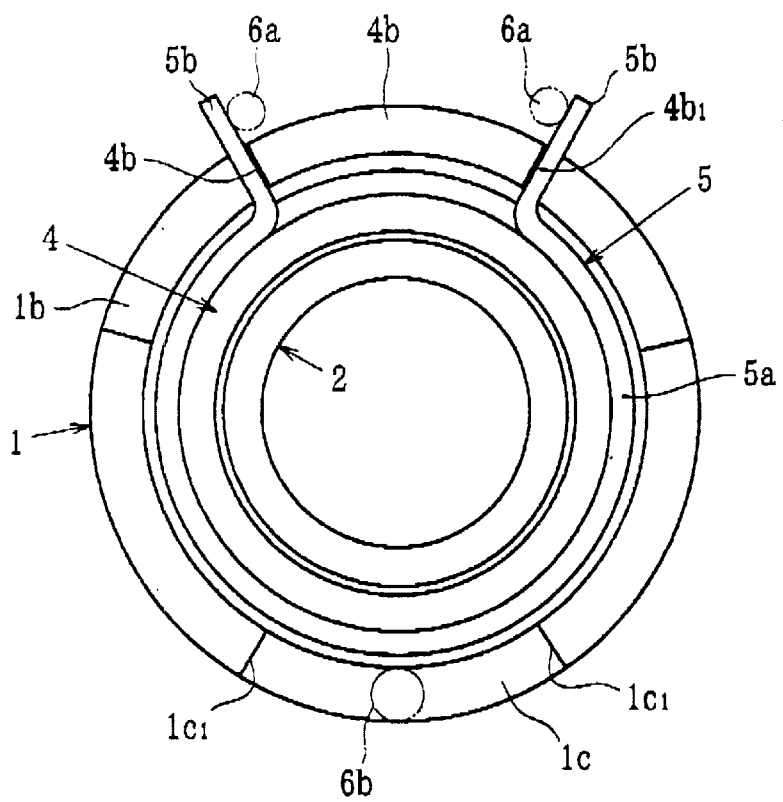
FIG. 3 is a view seen in the direction of the arrow X in FIG. 1A.

As shown in FIGS. 2A and 2B, the retainer 4 includes a plurality of window-shaped pockets 4a to accommodate the rollers 3, and a projection portion 4b provided on one end surface side. The projection portion 4b extends in the direction of the outer diameter from the one end surface, and then in the axial direction. At the inner diameter side of the projection portion 4b, there is the annular shaped portion 5a of the centering spring 5 which will be described. The engaging portions 5b of the centering spring 5 are disposed at the circumferential wall surfaces 4b1 of the projection portion 4b. FIG. 3 is a view seen in the direction of arrow x in FIG. 1A. The centering spring 5 includes the annular portion 5a, a pair of engaging portions 5b extending to the outer diameter side from both ends of the annular portion 5a. The annular portion 5a of the centering spring 5 is mounted on the inner diameter side of the projection portion 4b of the retainer 4. The pair of engaging portions 5b are engaged with the circumferential wall surfaces 4b1 of the projection 4b. The pair of engaging portions 5b of the centering spring 5 are engaged with an engaging pins 6a of a stationary side member 6 (see FIG. 4). Thus, the retainer 4 is coupled with the stationary side member 6 through the centering spring 5 in the pivotal direction.

At one end surface of the outer ring 1, there are notch portions 1b and 1c. The projection portion 4b of the retainer 4 and the engaging portions 5b of the centering spring 5 are disposed in the notch portion 1b. The stopper pin 6b of the stationary side member 6 is disposed in the notch portion 1c. The circumferential wall surface 1c1 of the notch portion 1c and the stopper pin 6b form a stopper portion restricting the pivotal range of the outer ring 1. More specifically, the pivotal range of the outer ring 1 is restricted within the range between the abutments of the circumferential wall surfaces 1c1 of the notch portion 1c against the stopper pin 6b.

For example in FIG. 3, as the retainer 4 pivots in the anti-clockwise direction, the engaging portion 5b on the right side of the centering spring 5 engages with the engaging pin 6a. The engaging portion 5b on the left side is pressed by the circumferential wall surface 4b1 to deform in the anti-clockwise direction. Therefore, the centering spring 5 deflects in the direction in which the pair of engaging portions 5b are forced to expand, and has the elastic force corresponding to the deflection amount accumulated. Note that when the retainer 4 pivots in the clockwise direction, the elastic force is accumulated at the centering spring 5 by the operation opposite to the above.

Figure 4:
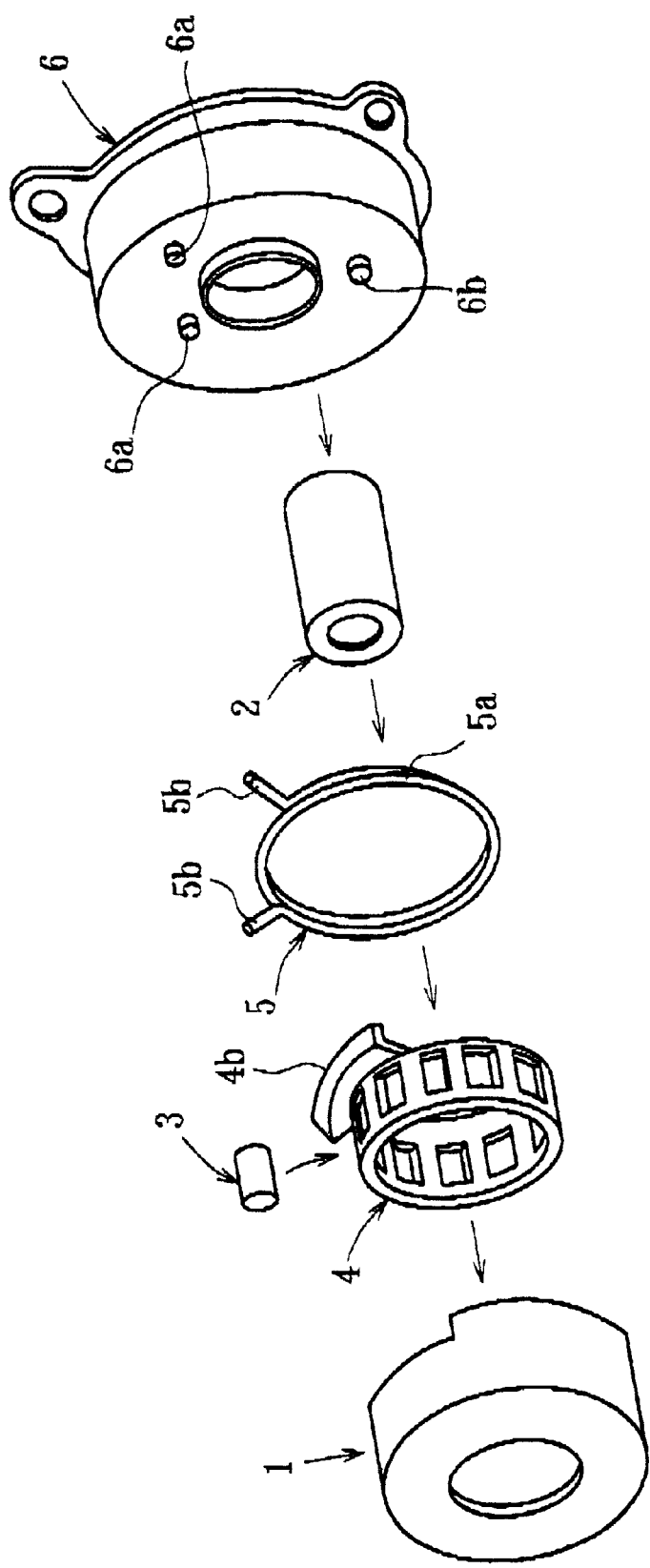
FIG. 4 is an exploded perspective view of how the clutch unit is assembled.

The clutch unit according to the embodiment is used for example in combination with the stationary side member 6 as shown in FIG. 4. The inner ring 2 is pivotally mounted to the inner diameter portion of the stationary side member 6. The engaging portion 5b of the centering spring 5 is engaged with the engaging pin 6a. The notch portion 1c of the outer ring 1 is mounted to the stopper pin 6b. The stationary side member 6 is fixed to a fixed member which is not shown.

Figure 5:
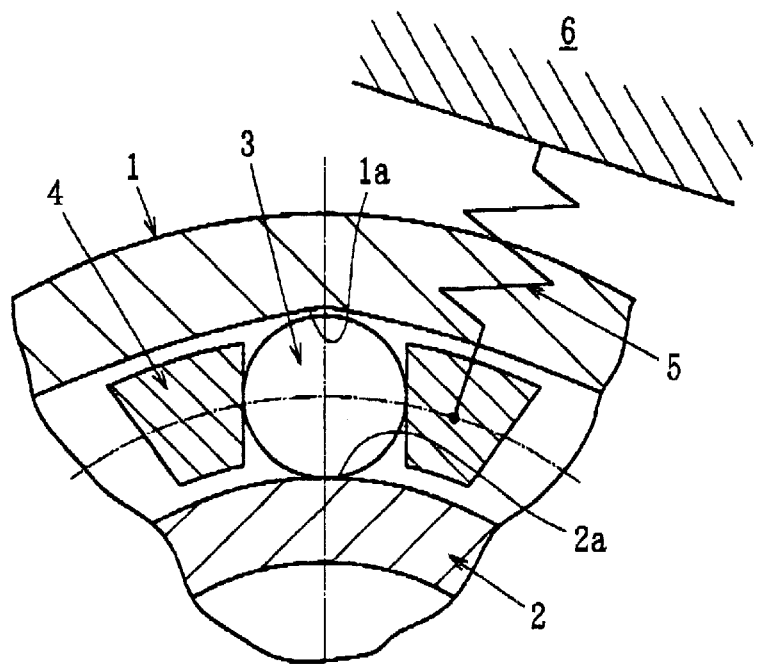
FIGS. 5 to 7 are schematic views for use in illustration of the concept of the operation of the clutch unit according to the embodiment.
Figure 6:
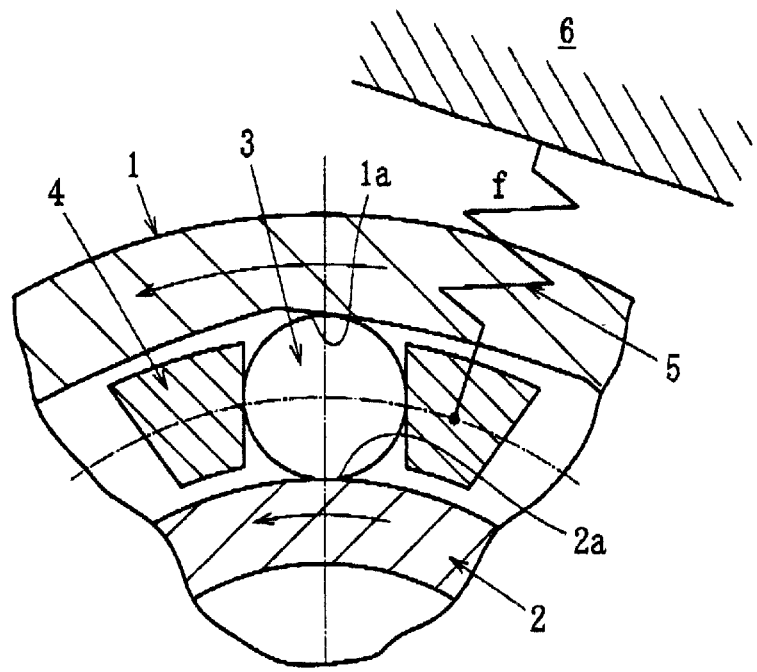
Figure 7:
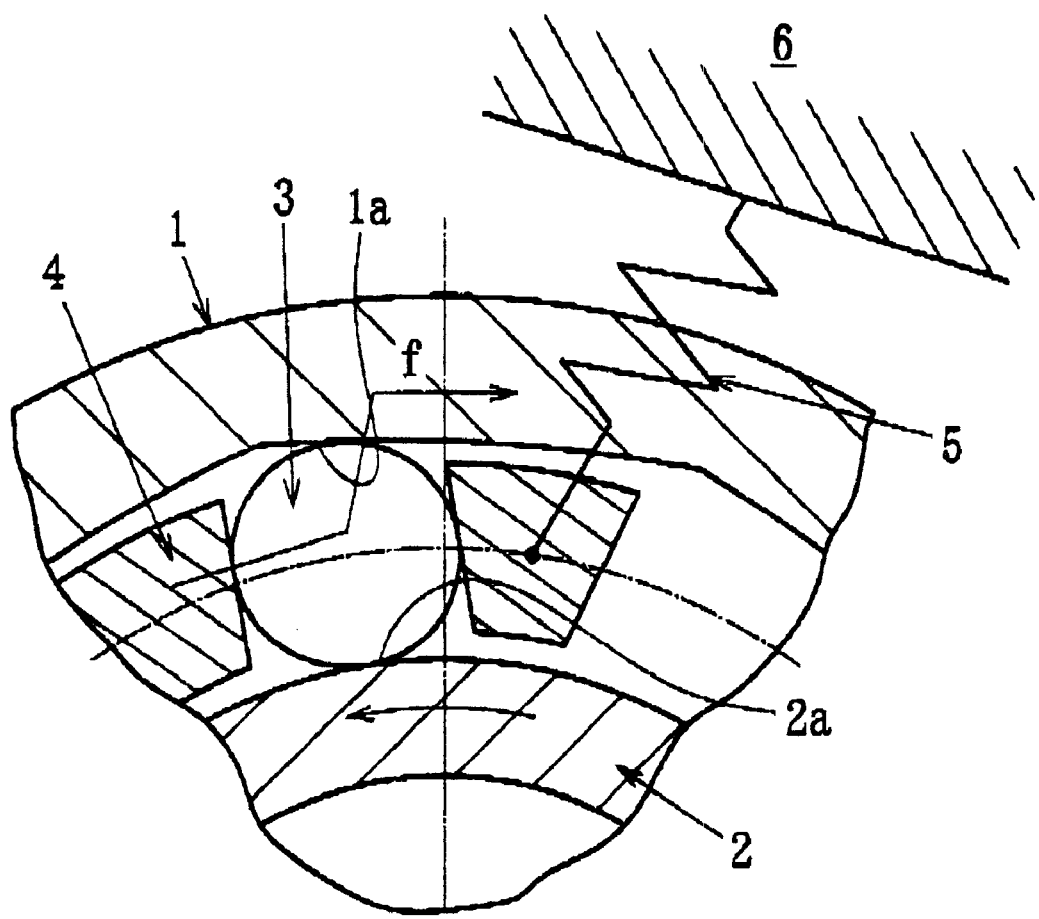

Referring to FIGS. 5 to 7, the operation of the clutch unit according to the embodiment will be now described. Note that in FIGS. 5 to 7, the centering spring 5 and the stationary side member 6 are shown in schematic representation for illustration of the concepts of the members. The operation member 7 is not shown.

FIG. 5 shows the clutch unit in the neutral position (the state shown in FIG. 3). In the neutral position, the roller 3 is positioned in the center of the cam surface 1a, and disengaged from wedge-shaped clearances both in normal and reverse directions defined between the cam surface 1a and the circumferential surface 2a. The diameter of the roller 3 is slightly smaller than the distance in the radial direction between the central part of the cam surface 1a and the circumferential surface 2a. Therefore, there are clearances in the radial direction between the roller 3 and the central part of the cam surface 1a and between the roller 3 and the circumferential surface 2a. According to the embodiment, a reverse input torque input from the output side to the inner ring 2 is locked in the normal and reverse directions. Therefore, the inner ring 2 pivots only for the input torque input from the operation member 7 (outer ring 1), and maintains its position for the reversed input torque input from the output side without pivoting.

FIG. 6 shows the state in which an input torque is provided to the outer ring 1 by the pivotal operation of the operation member 7. For example in FIG. 6, when an input torque is provided to the outer ring 1 in the anti-clockwise direction, the cam surface 1a moves relative to the roller 3 in the anti-clockwise direction as the outer ring 1 pivots, and the roller 3 engages into (interlocks with) the wedge-shaped clearance. Thus, the input torque from the outer ring 1 is transmitted to the inner ring 2 through the roller 3, and the outer ring 1, the roller 3, the retainer 4 and the inner ring 2 pivot together in the anti-clockwise direction. Note that the maximum pivot amount is restricted by the stopper portion (the circumferential wall surfaces 1c1 of the notch portion 1c and the stopper pin 6b). The centering spring 5 deflects as the retainer 4 pivots, and elastic force f corresponding to the deflection amount is accumulated.

FIG. 7 shows the state in which the operation member 7 (outer ring 1) is released. The elastic force f accumulated at the centering spring 5 causes the pivotal force in the clockwise direction to act upon the retainer 4, so that the roller 3 is pressed by the retainer 4 to press the cam surface 1a. Then, as the outer ring 1 has been released, the roller 3, the retainer 4, and the outer ring 1 run idle in the clockwise direction with respect to the inner ring 2 and return to the neutral position as shown in FIG. 5. The inner ring 2 maintains its pivotal position provided by the pivotal operation shown in FIG. 6. Therefore, when the pivotal operation in FIG. 6 is repeated, the pivotal amount for each pivotal operation is accumulated at the inner ring 2 manyfold.

In FIGS. 5 to 7, when an input torque in the clockwise direction is provided to the outer ring 1, the same operation as the above is performed (though in the opposite operation direction).

An input torque may be provided from the inner ring side. In this case, a cam surface is provided at the outer circumference of the inner ring, and a circumferential surface is provided at the inner circumference of the outer ring.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A clutch unit comprising:

an input side member having a cam surface;

an output side member having a circumferential surface, wherein the cam surface of the input side member forms a wedge-shaped clearance, respectively, in the normal and reverse directions between the cam surface and the circumferential surface of the output side member;

an engaging element interposed between the cam surface of said input side member and the circumferential surface of said output side member;

a retainer for retaining said engaging element; and an elastic member having an annular portion and a pair of engaging portions, the pair of engaging portions extending to an outer diameter side from both ends of the annular portion for coupling said retainer to a stationary side member in a pivotal direction.

2. The clutch unit according to claim 1, further comprising a stopper portion for restricting the pivotal range of said input side member.

* * * * *